United States Patent [19]
Mund et al.

[11] 3,961,987
[45] June 8, 1976

[54] ELECTRO-CATALYST AND PROCESS OF MANUFACTURE

[75] Inventors: Konrad Mund; Rolf Schulte, both of Erlangen, Germany

[73] Assignee: Siemens Aktiengesellschaft, Munich, Germany

[22] Filed: May 23, 1974

[21] Appl. No.: 472,699

[30] Foreign Application Priority Data

June 1, 1973    Germany............................ 2328050

[52] U.S. Cl............................ 136/86 D; 136/120 FC
[51] Int. Cl.²......................................... H01M 27/04
[58] Field of Search........ 136/120 FC, 120 R, 86 D; 252/437, 439, 472

[56] References Cited
UNITED STATES PATENTS

| | | | |
|---|---|---|---|
| 3,451,852 | 6/1969 | Steigelmann............. | 136/120 FC X |
| 3,530,006 | 9/1970 | Makishima et al. ...... | 136/120 FC X |
| 3,531,329 | 9/1970 | Selwitz.......................... | 136/120 FC |
| 3,573,988 | 4/1971 | McKee et al. ............ | 136/120 FC X |

FOREIGN PATENTS OR APPLICATIONS 2,055,676    5/1972    Germany

*Primary Examiner*—Anthony Skapars
*Attorney, Agent, or Firm*—Kenyon & Kenyon Reilly Carr & Chapin

[57] ABSTRACT

The invention relates to an electrocatalyst capable of being used, in particular, in anodes of fuel cells with acid electrolyte, and to a process for the manufacture of this electrocatalyst. The electrocatalyst contains at least one ternary metal compound which is composed of one metal of the iron group of the periodic table of elements, i.e. iron, cobalt or nickel, and two different elements of the phosphorus, arsenic, antimony, bismuth, sulfur, selenium and tellurium group, and has semiconducting characteristics. Examples of such ternary metal compounds serving as electrocatalysts are FePS, CoPS and CoAsS. The new electrocatalysts show a high catalytic effect and are insensitive to catalyst poisons.

10 Claims, 4 Drawing Figures

3,961,987

ELECTRO-CATALYST AND PROCESS OF MANUFACTURE

INTRODUCTION

The invention relates to an electrocatalyst, in particular for anodes in fuel cells with acid electrolyte, comprising at least one compound of a metal of the iron group of the periodic table of elements and an element of the group consisting of phosphorus, arsenic, antimony, bismuth, sulfur, selenium or tellurium, and to a process for the manufacture of such electrocatalysts.

BACKGROUND OF THE INVENTION

The use of metal phosphides and metal disulfides such as $PtP_2$, $Ni_2P$ and $Co_2P$ as electrocatalysts in electrochemical cells, especially in fuel cells with alkaline electrolyte, is already known (U.S. Pat. Nos. 3,411,953; 3,449,169; 3,451,852 and 3,573,988). However, these catalysts are still unsatisfactory in various respects. The use of expensive metals such as platinum in $PtP_2$ runs counter to the economical application of electrochemical cells like fuel cells. Beyond this, the natural occurrence of platinum is limited. On the other hand, there is a great need for catalysts which can be used in electrochemical cells with acid electrolyte, and in them, as again, catalysts for the anode. In addition, the catalysts should have a wide spectrum of applicability. Tests have shown, for example, that nickel and cobalt phosphide ($Ni_2P$ and $Co_2P$), known for the anodic oxidation of hydrazine, corrodes and is, therefore, not suited for the oxidation of hydrogen in fuel cells with acid electrolyte.

Also, metal phosphide catalysts for electrodes, particularly anodes, of electrochemical cells, particularly fuel cells with acid electrolyte, have already been proposed, containing at least one metal phosphide of one or more metals of the first and seventh side group as well as the metals of the iron group of the periodic table of elements with a phosphorus content in the metal phosphide of at least 1 phosphorus atom per metal atom, (U.S. patent application Ser. No. 343,959 filed Mar. 22, 1973). These electrocatalysts containing metal phosphides rich in phosphorus have proven to be suitable for the electrochemical oxidation of hydrogen. High current densities can be obtained with electrodes containing such catalysts. One electrocatalyst from this series is cobalt phosphide $CoP_3$, for example. It has also been found that arsenic can be substituted for phosphorus in these compounds and that such compounds, such as the compound $CoAs_2$, are also catalytically active. It is an unfavorable factor, however, that the corrosion resistance range of the said compounds is relatively narrow, amounting to only about 150 mV for $CoP_3$, for example, when measured against the potential of the reversible hydrogen electrode.

It is an object of the invention to provide a new group of electrocatalysts, i.e. catalysts for electrodes of electrochemical cells, by which the supply of effective electrocatalysts can be enlarged considerably. Specifically, it is an object to provide new electrocatalysts which enable a greater selection of active anode materials, a special application being fuel elements with acid electrolyte. It is a further object of the invention to provide a new electrocatalyst which is inexpensive and maintains a high catalytic efficiency for a long period of time, i.e. it is indifferent to catalyst poisons. It is a further object of the present invention to provide a new electrocatalyst that is relatively resistant to corrosion.

BRIEF DESCRIPTION OF THE INVENTION

According to the invention, the objectives are accomplished by an iron group metal compound containing two different elements of the group phosphorus, arsenic, antimony, bismuth, sulfur, selenium and tellurium, and possessing semiconducting characteristics. The iron group metals, which belong to the eighth side group of the periodic table of elements, are understood to be the metals iron, cobalt and nickel. The elements of the group P, As, Sb, Bi, S, Se and Te which are in the fifth and sixth main group of the periodic table of elements are generally considered as belonging to the semimetals or metalloids, except for S.

DETAILED DESCRIPTION OF THE INVENTION

In the context of the present application, semiconductors or compounds having semiconducting characteristics are understood to be compounds whose electrical resistance has a negative temperature coefficient, i.e. it decreases with increasing temperature. Such compounds occupy a position in the middle between the metallic conductors and the nonconductors (insulators) (see Gustav E. R. Schulze "Metallphysik", Akademie-Verlag Berlin, 1967, p. 263 ff). Compounds such as CoSeTe, NiAsS and NiSeTe, which have no semiconducting characteristics, but possess metallic conductivity (see among others, J. Phys. Chem. Solids, Vol. 26, 1965, p. 429–33), are not electrocatalysts, i.e. they are inactive catalytically.

The electrocatalyst according to the invention shows high activity, in particular for anodic oxidation, and is extraordinarily corrosion-resistant, especially in an acid medium, too, which must be called quite surprising and by no means predictable. Beyond this, the electrocatalyst according to the invention is able to maintain its activity over a long period of time, and it is relatively indifferent to catalyst poisons. Finally, the electrocatalyst also offers the advantage of high electronic conductivity.

The electrocatalyst according to the invention is particularly well suited for use in a fuel cell with an anode containing this catalyst, for the electrochemical conversion of hydrogen, compounds containing hydrogen and organic fuels; with a cathode for the electrochemical conversion of oxygen or oxidants containing oxygen; and with an acid electrolyte. If hydrogen is used as fuel, the electrocatalyst according to the invention is not poisoned by the carbon monoxide, for instance, which may be contained in the hydrogen due to its production by vapor reformation of alcohols or hydrocarbons or decomposition of methanol ($CH_3OH \rightarrow 2\ H_2 + CO$). Formaldehyde, for example, may be used as the organic fuel. The electrocatalyst according to the invention is also suited for generating hydrogen cathodically.

All of the metal compounds contained in the electrocatalyst according to the invention are of ternary nature. These ternary metal compounds can be represented by a general formula like MXY in which M is the metal of the iron group, and X and Y represent two different elements of the group P, As, Sb, Bi, S, Se and Te. The ternary metal compounds contained in the electrocatalyst may also be metal compounds in which there are two or more atoms of the elements X or Y for every metal atom M, for instance a compound such as CoPS$_3$, i.e. compounds of the general formula M$_a$X$_b$Y$_c$.

The electrocatalyst according to the invention can advantageously contain at least one of the following ternary metal compounds: FePS, CoPS and CoAsS. These compounds already show their catalytic activity, particularly in the electrochemical oxidation of hydrogen or gas mixtures containing hydrogen, at coating densities as low as approximately 200 mg/cm$^2$, for instance, and at room temperature (approximately 22°C). For example, a current density of more than 60 mA/cm$^2$ is obtained with an electrode containing CoPS in the anodic oxidation of hydrogen at 70°C in 2.5 mH$_2$SO$_4$, a coating of 200 mg/cm$^2$ and a polarization of 200 mV when measured against the reversible hydrogen potential. The high current density obtained with CoPS is kept intact even in extended time tests. CoPS can also be used to advantage for the anodic oxidation of formaldehyde and formic acid. The greater stability range, perhaps as compared to CoP$_3$, which permits more overvoltage, has a beneficial effect. Beyond this, CoPS is particularly insensitive to CO poisoning.

Especially CoPS offers the additional advantage of being a good electrical conductor despite its semiconductor characteristics. At temperatures as low as room temperature, CoPS in powder form shows good electrical conductivity so that when used in electrodes, an additional, electrically conductive carrier material is unnecesary; such a carrier material is required, for instance, where other electrode materials such as molybdenum disulfide (MoS$_2$) are involved. To this must be added that CoPS is cheap to produce and can be produced in large quantities.

To obtain a larger surface area, it is advantageous for the electrocatalyst according to the invention to be present in powder form, the powderized catalyst material being placed between a diaphragm, which is gastight in the electrolyte-impregnated state, and a supporting skeleton, such as a supporting screen, in an electrode containing this catalyst. Such an electrode design is known as such and is generally called a "supported electrode" (see, among others, F. V. Sturm "Elektrochemische Stromerzeugung" ["Electrochemical Current Generation"], Verlag Chemie GmbH, Weinheim/Bergstrasse, 1969, p. 109 ff.) or U.S. Pat. No. 3,471,336. Generally, the grain size of the powdered catalyst material ranges between 1 and 50 $\mu$.

An electrode containing the electrocatalyst according to the invention may also be designed so that the powdered catalyst material is mixed with a plastic binder, and the particles of the catalyst material are then joined by the binder to each other and, if applicable, to a diaphragm which is gastight in the electrolyte-impregnated condition. The plastic binder must be resistant to the respective electrolytic fluid. Due to its good properties, a butadiene-styrene-acrylonitrile copolymer has proven to be particularly advantageous when sulphuric acid is used as the electrolytic fluid. If hydrophobic binders are used, the electrode may then also be made hydrophobic, which is of particular advantage if the electrode is intended for low-pressure operation.

To produce the ternary metal compounds for the electrocatalyst according to the invention, a metal of the iron group or a compound of one of these metals in powder form is caused to react at elevated temperature with two different elements of the group phosphorus, arsenic, antimony, bismuth, sulfur, selenium and tellurium or with at least one compound of these two elements. For example, the metal and the two elements of the group P, As, Sb, Bi, S, Se and Te in powder form may be put into a vial in appropriate stoichiometric proportions and heated for an extended period of time to a temperature of several hundred degrees C. But the two elements may also be in the form of a compound prior to forming yet another compound with the iron group metal. For example, to produce CoPS, the two-element compound phosphorus pentasulfide P$_2$S$_5$ (or P$_4$S$_{10}$) in powder form and cobalt powder may be put into a vial in stoichiometric proportion and heated to a temperature of several hundred degrees C.

Care should be taken when producing the ternary metal compounds that an end product having a large surface area is obtained. It is for this reason that the electrocatalyst is produced specifically so that an additive which serves to form a large surface area is admixed to the ingredients in powder form. Activated carbon is used preferably as such an additive. Since it is insoluble it remains in the end product. Soluble additives which are particularly well suited are sodium fluoride and potassium carbonate. These are dissolved out of the end product after the catalyst has been produced.

The additive protects the metal powder or its compound in powder form from sintering together during the reaction with the two elements or their compounds, so that catalysts of large active surface area are obtained. Beyond this, the addition of such additives shortens the reaction time. The additives are inert to the starting material and to the reaction products, and their melting point is above the reaction temperature.

It is of particular advantage in the manufacture of the ternary metal compounds for the electrocatalyst to use the metal in the form of a product produced by the reduction of metal salts such as metal oxalates or metal carbonates. Hydrogen in particular may serve as the reducing agent. Such metals have a large surface area and are very reactive.

The invention will now be described in greater detail with reference to several Figures and Examples.

EXAMPLE 1

To produce CoPS in powder form, 4.24 grams Co powder (grain size: about 1 $\mu$) are mixed with 4.24 grams NaF powder and put into a thick-walled quartz vial together with 8.00 grams P$_2$S$_5$ powder. The vial is evacuated and sealed off. The vial is heated in a tube furnace to 650°C for 16 hours. When the reaction is concluded, the vial is cooled and opened. The gray-black powder obtained is put into distilled water to dissolve the sodium fluoride; H$_2$S forms in the process. The powder is subsequently dried. The end product was tested by the Debye-Scherrer method and the presence of CoPS was found.

The CoPS in powder form, produced in the described manner, is built into a supported electrode. To do this, the catalyst material is suspended in 2.5 m H$_2$SO$_4$ and left to settle on asbestos paper. A carbon mesh is subsequently applied to the catalyst layer for support and contacting. In this example, the catalyst coating amounts to approximately 200 mg/cm$^2$.

Figure 1:
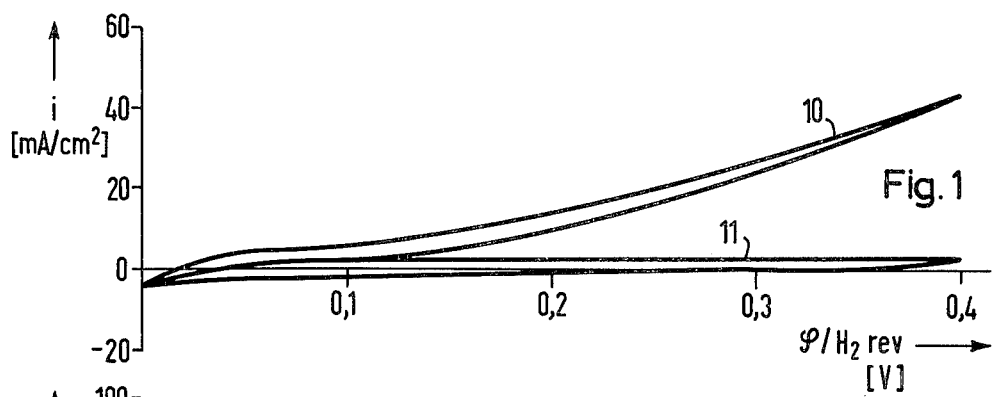
FIGS. 1 to 3 show electrical characteristics of electrodes containing the electrocatalyst according to the invention.

The characteristics of such an electrode were measured in a half-cell arrangement with 2.5 m $H_2SO_4$ as the electrolytic fluid. When the electrode was immersed in the electrolytic fluid, it developed a potential of 0.6 V, measured against the reversible $H_2$-electrode in the same electrolyte. Hydrogen was then introduced to the electrode at 10 N/cm$^2$ overpressure; after about 4 minutes it had reached the reversible $H_2$-potential. The characteristics were then recorded by potentiodynamic loading at slow potential rate of change (0.4 V/min). As may be seen from FIG. 1, which shows such characteristics, a current density of 12 mA/cm$^2$ was obtained at 22°C and a polarization of 200 mV (curve 10). Curve 11, recorded with argon instead of $H_2$, shows that no corrosion occurs up to a potential of 0.35 V.

Figure 2:
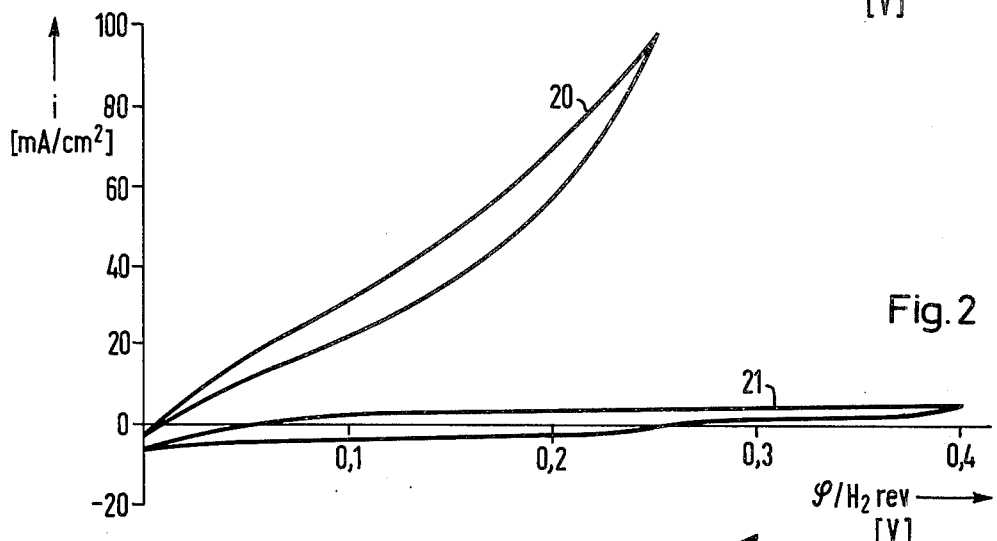

FIG. 2 shows characteristics recorded at an electrolyte temperature of 70°C under otherwise identical conditions. It turns out that a current density of 60 mA/cm$^2$ (curve 20) is obtained with hydrogen at a polarization of 200 mV, and it is evident from curve 21 which was obtained with argon that the corrosion resistance range extends at least to 0.3 V at an electrolyte temperature of 70°C. The voltage drop between the Luggin probe and the active layer of the electrode was eliminated in curves 10, 11, 20 and 21 (IR compensation).

As already explained, it is often important in the technical application of electrocatalysts that the catalyst's effectiveness not be impaired by carbon monoxide present in the reaction gas. Tests with CoPS-electrodes have now revealed that the current density drops by only about 10% under potentiostatic loading during the transition from pure hydrogen to a gas mixture containing 2% by volume CO, and that this influence is entirely reversible, which means that the current density increases again to its original value when changing back to pure $H_2$.

Figure 3:
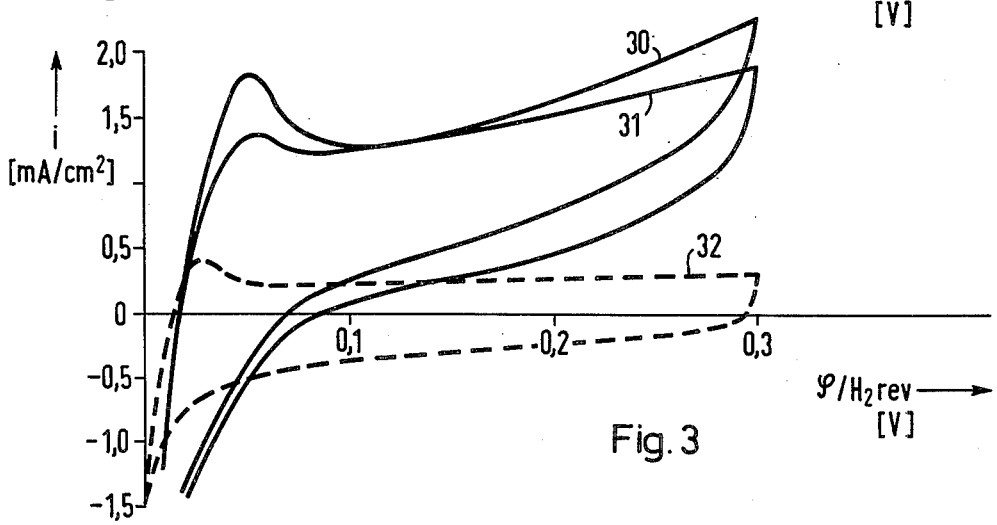

In order to test the catalytic activity of CoPS during the anodic oxidation of formaldehyde and formic acid, characteristics under potentiodynamic loading (potential rate of change: 0.1 V/min) were recorded; these characteristics are shown in FIG. 3. The curves were obtained with a supported electrode (coating density: 200 mg/cm$^2$) at 70°C. Curve 30 applies to a HCHO solution in 2.5 m $H_2SO_4$, and curve 31 to an HCOOH solution in 2.5 m $H_2SO_4$; curve 32 applies to the pure electrolytic fluid, i.e. 2.5 m $H_2SO_4$.

Other tests have revealed that CoPS also shows catalytic activity for the reduction of oxygen, which means that it can be used as an electrocatalyst in fuel cell cathodes (acid electrolyte). For example, a supported CoPS electrode with a coating density of 200 mg/cm$^2$ yielded a current density of $-25$ mA/cm$^2$ at a potential of 0.6 V in 2.5 m $H_2SO_4$ and a temperature of 22°C (oxygen pressure: 10 N/cm$^2$). The extended time test revealed, however, that this current density remained constant at room temperature only, when the electrolyte was heated to 70°C, the current density first rose, then dropped due to the corrosion of the catalyst.

EXAMPLE 2

To produce CoAsS in powder form, 3.83 grams Co powder are mixed with 7.66 grams NaF powder and put into a thick-walled quartz vial together with 8.00 grams $As_2S_3$ powder. After evacuating and sealing the vial, it is heated in a tube furnace to 650°C for 24 hours. When the reaction is concluded, the vial is cooled and opened. The $As_2S_3$ powder is completely transformed. The NaF powder is subsequently washed out with distilled water, some $H_2S$ escaping. X-ray analysis of the structure shows that the ternary metal compound CoAsS of cubic structure has formed.

As in Example 1, the CoAsS compound was built into a supported electrode for electrochemical examination (coating density: 200 mg/cm$^2$). It turned out that the electrode produced a potential of 0.66 V in 2.5 m $H_2SO_4$ as the electrolytic fluid at 22°C. But this changed very quickly when the electrode was supplied with $H_2$ (pressure: 12 N/cm$^2$). After 2 minutes the electrode produced the reversible $H_2$-potential. The result of additional tests was that the electrode can be charged with a current density of 5 mA/cm$^2$ at room temperature and a polarization of 200mV.

Figure 4:
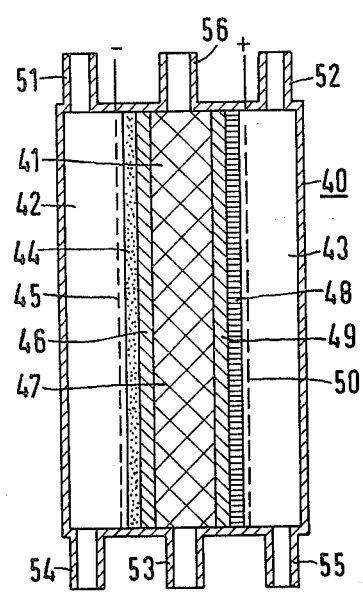
FIG. 4 shows schematically a fuel cell with an electrode containing the catalyst according to the invention.

FIG. 4 shows schematically a fuel cell with an electrode containing the electrocatalyst according to the invention. The fuel cell consists of a housing 40 with an electrolyte chamber 41 and two gas chambers 42 and 43. An anode 44 containing the electrocatalyst such as CoPS is disposed between the electrolyte chamber 41 and the one gas chamber 42. The catalyst layer in powder form is pushed against an asbestos cover layer 46 serving as diaphragm, which is gastight in the electrolyte-impregnated state, by a carbon screen 45 serving as supporting skeleton. The carbon screen 45 serves at the same time for contacting and current tapping. The electrolyte chamber 41 comprises a supporting skeleton 47, such as in the form of a polypropylene screen. A cathode 48 is disposed between the other gas chamber 43 and the electrolyte chamber 41. Electrodes known per se may be used as cathodes, such as a tantalum screen to which platinum black is applied as catalyst material, or a cathode containing activated carbon. The cathode 48 is separated from the electrolyte chamber 41 by an asbestos cover layer 49 which is gastight in the electrolyte-impregnated state. For contacting and current tapping the cathode 48 is provided on its side facing the gas chamber 43 with a carbon mesh 50. A fuel such as gaseous hydrogen is supplied through a line 51 to the gas chamber 42 adjacent to the anode 44 to operate the fuel cell. An oxidizing agent such as gaseous oxygen is supplied through a line 52 to the gas chamber 43 adjacent to the cathode 48. The electrolyte chamber 41 is supplied through a line 53 with the electrolyte such as 2.5 molar sulfuric acid (2.5 m $H_2SO_4$). The unconsumed portions of the reaction gases and the electrolyte can be removed from the fuel cell through the lines 54, 55 and 56, respectively. The electrolyte may have an operating temperature of, for instance, approximately 70°C.

In addition to fuel cells, the electrocatalyst according to the invention can also be used in other electrochemical cells for electrosynthesis or electrolysis—as well as in storage batteries. When used in storage batteries, the electrocatalyst according to the invention may serve specifically as electrode material for indicator and dissipation electrodes in gastight storage batteries. Provision must be made in such storage batteries to prevent the gases which form during charging or during discharging from exerting an excessively high pressure. To accomplish this, the capacity of the positive electrode is made greater than that of the negative electrode, for instance, so that, in the case of overcharging, hydrogen forms first at the negative electrode (2 $H_2O + 2 e^- \rightarrow$ $H_2 + 2 OH^-$). Now, basically, two possible methods of preventing excessive hydrogen gas pressure are known. Firstly, a so-called dissipation electrode can be built into the storage battery to re-combine the hydrogen that has formed and to dissolve it again in this manner. Secondly, a so-called indicator electrode may be used in the storage battery which is active catalytically and produces a reversible hydrogen potential upon contact with the hydrogen. This potential, measured against a reference electrode, may then be utilized as a control signal to terminate the charging process.

What is claimed is:

1. An electrocatalyst comprising at least one compound with semiconductor characteristics consisting of a metal of the iron group of the periodic table of elements and two different elements selected from the group consisting of phosphorous, arsenic, antimony, bismuth, tellurium and sulfur or selenium.

2. Electrocatalyst according to claim 1 wherein the compound is FePS.

3. Electrocatalyst according to claim 1 wherein the compound is CoPS.

4. Electrocatalyst according to claim 1 wherein the compond is CoAsS.

5. Electrocatalyst according to claim 1 wherein the catalyst material is present as a powder having an average grain diameter of between 1 and 50 microns.

6. An electrode adapted for use in a fuel cell having an acid electrolyte, said electrode comprising an electrocatalyst having a formula MXY with semi-conducting characteristics, wherein M is a metal selected from the iron group of the periodic table of elements and X and Y are two different elements selected from the group consisting of phosphorous, arsenic, antimony, bismuth, tellurium and sulfur or selenium.

7. The electrode according to claim 6 wherein the electrocatalyst is in the form of powder particles which are cohesively bound together by an acid resistant plastic matrix.

8. The electrode according to claim 7 wherein the plastic binder is a copolymer of butadiene-styrene-acrylonitrile.

9. The electrode according to claim 6 wherein the electrocatalyst in powder form also contains a surface area dispersant.

10. The electrode according to claim 9 wherein the surface area dispersant is activated carbon.

* * * * *

UNITED STATES PATENT AND TRADEMARK OFFICE
CERTIFICATE OF CORRECTION

PATENT NO. : 3 961 987
DATED : June 8, 1976
INVENTOR(S) : Konrad Mund et al

It is certified that error appears in the above-identified patent and that said Letters Patent are hereby corrected as shown below:

Column 5, line 68, change "evaluating" to -- evacuating --.

Column 7, line 25, change "compond" to --compound--

Signed and Sealed this

Fifth Day of October 1976

[SEAL]

Attest:

RUTH C. MASON
Attesting Officer

C. MARSHALL DANN
Commissioner of Patents and Trademarks